Patented Apr. 10, 1951

2,548,772

UNITED STATES PATENT OFFICE 2,548,772

METHOD OF PREPARING CYANOBUTYL GUANAMINE

John Edwards Castle, Wilmington, Del., assignor to E. I. du Pont de Nemours & Company, Wilmington, Del., a corporation of Delaware No Drawing. Application June 10, 1948, Serial No. 32,279

2 Claims. (Cl. 260—249.9)

This invention relates to a new organic compound and more particularly to a resin-forming and nitrogen-containing organic compound.

Compounds reactive with aldehydes and particularly with formaldehyde are presently of considerable interest. Examples of such compounds are urea, phenolic compounds, aromatic amines and certain triazines. The properties of the resulting formaldehyde resins vary with the specific compounds used and all of the above-mentioned compounds have found utility in the production of condensation resins for various purposes. Thus, the melamine resins can be used in the manufacture of molded products and in textile treatment as a shrink-setting agent. However, concentrated aqueous solutions of these latter resins do not have a long storage life and are otherwise susceptible to certain disadvantages for many applications, for example, the resins are quite brittle and when applied to textiles absorb chlorine from bleaching baths.

This invention has as an object the provision of a new intermediate for thermosetting resins. A further object is a new class of thermosetting resins. Another object is the provision of resins of satisfactory flexibility and resistance to chlorine-containing bleaching baths. Other objects will appear hereinafter.

These objects are accomplished by the invention of omega-cyanobutylguanamine, i. e., 2,4-diamino-1,3,5-triazinyl-6-valeronitrile, i. e., 2-(omega - cyanobutyl) - 4,6 - diamino - sym - triazine, of the formula

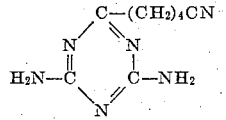

and of thermosetting resins by the reaction of said cyanobutylguanamine with aldehydes and particularly with formaldehyde.

Cyanobutylguanamine can be obtained by the reaction of dicyandiamide with adiponitrile at temperatures of 150–250° C., preferably in the presence of a basic catalyst.

The following examples, in which the parts given are by weight, further illustrate the practice of this invention. The first three examples illustrate the preparation of the guanamine while the last two show its use in the preparation of resins.

Example I

A mixture of 42 parts of dicyandiamide, 108 parts of adiponitrile (corresponding to a molar ratio of 1:2), and 10 parts of piperidine was heated at 168° C. A crystalline precipitate appeared in five minutes and in ten minutes the reaction mixture was substantially solid at which time an additional 100 parts of adiponitrile was added and the mixture heated at 155° C. for one hour. The reaction mixture was washed by slurrying with acetone. The dried product weighed 58.8 parts, corresponding to a yield of 61%, and melted at 235–245° C. Eleven parts of the product was dissolved in 600 parts of boiling water, one part of decolorizing charcoal was added, and the mixture filtered and cooled. There was obtained 5.6 parts of pure white product melting at 250–252° C. and which had the following analysis:

Calculated for $C_8H_{12}N_6$: C, 50.0%; H, 6.3%; N, 43.7%.
Found: C, 49.9%; H, 6.8%; N, 44.6%.

The product was insoluble in both hot and cold benzene and carbon tetrachloride, but soluble in hot water and in formalin and slightly soluble in hot 95% ethanol.

A white polymeric solid was formed by evaporating a clear solution of 0.25 part of the above cyanobutylguanamine in ten parts of 37% formaldehyde solution.

Example II

A total of 216 parts of adiponitrile, 134.4 parts of dicyandiamide and six parts of piperidine was mixed in a vessel equipped with a reflux condenser and heated by immersion of the flask in a metal bath at 190–200° C. for five hours. The reaction mixture was cooled and the solid product, after thorough grinding, was washed with hot methanol and filtered. There was obtained 268 parts (87%) of product which was recrystallized from 6,000 parts of boiling water to give 193 parts (62.8% yield) of whitish crystals melting at 251° C.

Example III

A mixture of 108 parts of adiponitrile and 84 parts of dicyandiamide was heated at a temperature of 200–215° C. for four hours. At the end of this time, there was partial solidification of the mixture. The mixture was cooled, crushed and extracted with hot methanol. The cyanobutylguanamine thus obtained was recrystallized from water. It was formed in lower yield than when a catalyst was employed in the preparation.

Example IV

To a solution of 90 parts of 37% formaldehyde and 0.5 part of potassium carbonate heated at 70–80° C. was added 25 parts of cyanobutylguanamine. It was heated for one hour, forming a clear mobile solution. A portion of the aqueous solution was spread on a glass surface and baked for one hour at 120° C. A hard clear film was obtained. Another portion of the solution was acidified to a pH of 2. Films flowed from the acidified solution on baking were water insensitive. Acidification may be made to a pH of 1.5 to 6 to obtain this result.

*Example V*

A mixture of 60 parts of cyanobutylguanamine, 300 parts of 37% formaldehyde solution, 200 parts of n-butyl alcohol, 16 parts of toluene and four parts of maleic acid was refluxed over a total of six hours during which time a total of 245 parts of water was removed from the reflux condensate. During an additional hour of heating, about 40 parts of organic distillate was removed. The remaining solution was miscible with toluene and xylene and consisted of the butoxymethyl derivative of cyanobutylguanamine. Approximately equivalent quantities of this solution were mixed with both castor oil- and soybean oil-modified glycerol phthalates. After baking films prepared from these mixtures at 140° C., dry, hard, water- and wear-resistant coatings were obtained.

The reaction of dicyandiamide with adiponitrile is generally conducted with substantially molar equivalents of the reactants or with an excess of the adiponitrile to minimize decomposition of the dicyandiamide. However, the reaction takes place over a wide range of ratios of the reactants, e. g., from 0.5 to 10 molar equivalents of adiponitrile per mol of dicyandiamide.

The reaction of adiponitrile and dicyandiamide takes place to give the guanamine in the abscence of added catalyst but optimum rates are achieved when a basic catalyst is present. Catalysts such as piperidine, piperidine acetate, morpholine and sodium carbonate have been found effective. Other basic catalysts that can be used are the ammonium and amine salts of weak acids, organic amines, e. g., quinoline, piperazine, triethylamine, pyridine, etc., inorganic bases such as alkali metal alkoxides, hydroxides, carbonates, acetates, e. g., sodium ethoxide, sodium hydroxide, potassium bicarbonate, sodium acetate, etc. Strongly basic catalysts are preferred. The amount of base present can be varied widely. Bases such as quinoline can be employed both as a catalyst and as a solvent and therefore be present in large quantities, e. g., two to ten times or more of the weight of reactants. Generally, the basic catalyst is present in amounts of up to 20% of the weight of reactants and generally from 0.001 to 20%, although the amount of catalyst is not a critical factor in the reaction.

The substitution of analogous dinitriles for adiponitrile, e. g., malononitrile and succinonitrile, does not give corresponding guanamines but rather dark resinous products. It is to be noted that but one of the nitrile groups of adiponitrile is affected in the reaction. It is further unexpected that the reaction of adiponitrile should take place at much lower temperatures than those required with other nitriles. For example, a reaction temperature of 165° C. has been found satisfactory for the preparation of the cyanobutylguanamine, while temperatures of the order of 190–195° C. are required for the reaction of dicyandiamide with acetonitrile and propionitrile. Moreover, n-valeronitrile has not been found to undergo this reaction even at temperatures as high as 200° C.

In general, the temperature and time employed for the synthesis of cyanobutylguanamine are interdependent variables. Temperatures of from 150–250° C. can be employed at times from as little as five minutes to twenty-four hours, the longer times being required when temperatures at the lower end of the effective range are employed. Inert solvents or diluents can be present, e. g., tetrahydronaphthalene, decahydronaphthalene, nitrobenzene, dimethyl phthalate, etc.

Cyanobutylguanamine reacts with formaldehyde to give resin-forming methylol derivatives as shown in Examples IV and V. The preferred ratios of formaldehyde to cyanobutylguanamine range from 1:1 to 4:1, on a molar basis, although higher ratios can be employed. Aldehydes in general, including benzaldehyde, acrolein, furfural, chloral, and acetaldehyde can be used in place of or in combination with formaldehyde.

Cyanobutylguanamine possesses several advantages over prior art materials as a resin intermediate. Aqueous solutions of methylol derivatives prepared from cyanobutylguanamine and formaldehyde have surprisingly long storage life without undergoing gelation. This effect is particularly marked in more concentrated solutions, in which the storage life is as much as four times that of a methylol melamine. The methylol derivatives of cyanobutylguanamine are easily applied to textiles, cellophane, or paper and are substantive to these substrates. When so applied in the presence of a mild acid catalyst and subsequently heat treated, useful resins are obtained on textiles, cellophane, or paper. Thus these resins are of value for cellophane coating, shrink-setting of textiles and paper treating. In general, the effects so obtained are superior to those obtained with melamine resins with respect to lack of brittleness and adherence to substrate. Textiles treated with the cyanobutylguanamine resins absorb less chlorine from bleaching baths than textiles similarly treated with corresponding melamine resins. The cyanobutylguanamine resins are unusually compatible with other materials such as alkyd resins.

The reaction of cyanobutylguanamine with formaldehyde can be conducted in the presence of alcohols in general and particularly in the presence of lower (1–6 carbon) alkanols, e. g., methanol, hexanol, ethanol. For instance, in n-butanol, the n-butyl ethers of the methylol derivatives are obtained. These materials are compatible with alkyd resins, and, on baking with an acid catalyst, form hard, tough and glossy resins of use as metal protective finishes.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process of preparing omega-cyanobutylguanamine

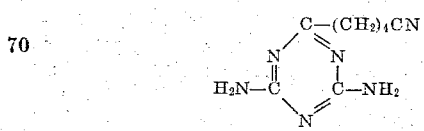

which comprises heating dicyandiamide with from ½ to 10 mols of adiponitrile, per mol of dicyandiamide, at a temperature within the range 150–250° C.

2. Process for preparing omega-cyanobutyl-guanamine

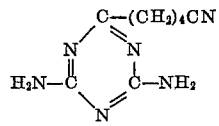

which comprises heating one mol of dicyandiamide with 1 to 10 mols of adiponitrile at 150–250° C. in the presence of a basic catalyst.

JOHN EDWARDS CASTLE.

REFERENCES CITED

The following references are of record in the file of this patent:

UNITED STATES PATENTS

| Number | Name | Date |
| --- | --- | --- |
| 2,302,162 | Zerweck | Nov. 17, 1942 |
| 2,394,526 | Thurston | Feb. 5, 1946 |